(12) United States Patent
Farrand et al.

(10) Patent No.: US 9,560,198 B2
(45) Date of Patent: *Jan. 31, 2017

(54) IDENTIFYING AND FILTERING INCOMING TELEPHONE CALLS TO ENHANCE PRIVACY

(71) Applicant: Ooma, Inc., Palo Alto, CA (US)

(72) Inventors: Tobin E. Farrand, Burlingame, CA (US); Kevin Snow, Granite Bay, CA (US); Dennis Peng, Palo Alto, CA (US); David A. Bryan, Cedar Park, TX (US)

(73) Assignee: Ooma, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,185

(22) Filed: Jul. 15, 2016

(65) Prior Publication Data

US 2016/0330319 A1    Nov. 10, 2016

Related U.S. Application Data

(63) Continuation-in-part of application No. 15/169,615, filed on May 31, 2016, which is a continuation of
(Continued)

(51) Int. Cl.
*H04M 3/436* (2006.01)
*H04M 7/00* (2006.01)
(Continued)

(52) U.S. Cl.
CPC .......... *H04M 3/436* (2013.01); *H04L 12/2823* (2013.01); *H04M 3/42059* (2013.01); *H04M 7/0033* (2013.01)

(58) Field of Classification Search
CPC .... H04M 1/00; H04M 1/663; H04M 3/42059; H04M 3/42153; H04M 3/436; H04M 3/4365; H04M 7/0033; H04W 4/16; H04L 12/2823
(Continued)

(56) References Cited

U.S. PATENT DOCUMENTS 5,425,085 A    6/1995    Weinberger et al.
5,519,769 A    5/1996    Weinberger et al.
(Continued)

FOREIGN PATENT DOCUMENTS

EP          3050287 A1      8/2016
WO    WO2015041738 A1      3/2015
(Continued)

OTHER PUBLICATIONS

International Search Report and Written Opinion mailed Nov. 7, 2014 for App. No. PCT/US2014/044945, filed Jun. 30, 2014. 12 pages.
(Continued)

*Primary Examiner* — Harry S Hong
(74) *Attorney, Agent, or Firm* — Carr & Ferrell LLP

(57) ABSTRACT

A computer-implemented method for filtering a telephone call is provided. The method may comprise: receiving from a caller the telephone call directed to a communication device associated with an intended call recipient, the Internet being disposed between a computer implementing the method and the communication device, the intended call recipient being in a structure; determining a state of the intended call recipient using telemetry received from at least one of a sensor and an appliance disposed in the structure; scoring the telephone call based on predetermined scoring criteria to create a score indicative of a desirability of the telephone call, the predetermined scoring criteria being
(Continued)

provided by the intended call recipient, the predetermined scoring criteria including the state of the intended call recipient; comparing the score to a predetermined threshold score; classifying the telephone call as an unwanted telephone call using the comparison; and selectively rejecting the unwanted telephone call.

20 Claims, 11 Drawing Sheets

Related U.S. Application Data application No. 14/034,457, filed on Sep. 23, 2013, now Pat. No. 9,386,148.

(51) Int. Cl.
  *H04M 3/42* (2006.01)
  *H04L 12/28* (2006.01)
(58) Field of Classification Search
  USPC .............. 379/188, 210.02, 210.03, 196–199
  See application file for complete search history.

(56) References Cited

U.S. PATENT DOCUMENTS

| | | |
|---|---|---|
| 5,796,736 A | 8/1998 | Suzuki |
| 6,023,724 A | 2/2000 | Bhatia et al. |
| 6,377,938 B1 | 4/2002 | Block et al. |
| 6,487,197 B1 | 11/2002 | Elliott |
| 6,615,264 B1 | 9/2003 | Stoltz et al. |
| 6,697,358 B2 | 2/2004 | Bernstein |
| 6,714,545 B1 | 3/2004 | Hugenberg et al. |
| 6,775,267 B1 | 8/2004 | Kung et al. |
| 6,778,528 B1 | 8/2004 | Blair et al. |
| 6,781,983 B1 | 8/2004 | Armistead |
| 6,934,258 B1 | 8/2005 | Smith et al. |
| 7,113,090 B1 | 9/2006 | Saylor et al. |
| 7,124,506 B2 | 10/2006 | Yamanashi et al. |
| 7,127,043 B2 | 10/2006 | Morris |
| 7,127,506 B1 | 10/2006 | Schmidt et al. |
| 7,154,891 B1 | 12/2006 | Callon |
| 7,295,660 B1 | 11/2007 | Higginbotham et al. |
| 7,342,925 B2 | 3/2008 | Cherchali et al. |
| 7,376,124 B2 | 5/2008 | Lee et al. |
| 7,394,803 B1 | 7/2008 | Petit-Huguenin et al. |
| 8,331,547 B2 | 12/2012 | Smith et al. |
| 8,350,694 B1 | 1/2013 | Trundle et al. |
| 8,515,021 B2 | 8/2013 | Farrand et al. |
| 9,225,626 B2 | 12/2015 | Capper et al. |
| 9,386,148 B2 * | 7/2016 | Farrand ................ H04M 3/436 |
| 2001/0053194 A1 | 12/2001 | Johnson |
| 2002/0016718 A1 | 2/2002 | Rothschild et al. |
| 2002/0035556 A1 | 3/2002 | Shah et al. |
| 2002/0037750 A1 | 3/2002 | Hussain et al. |
| 2002/0038167 A1 | 3/2002 | Chirnomas |
| 2002/0085692 A1 | 7/2002 | Katz |
| 2002/0140549 A1 | 10/2002 | Tseng |
| 2002/0165966 A1 | 11/2002 | Widegren et al. |
| 2003/0058844 A1 | 3/2003 | Sojka et al. |
| 2003/0099334 A1 | 5/2003 | Contractor |
| 2003/0141093 A1 | 7/2003 | Tirosh et al. |
| 2003/0164877 A1 | 9/2003 | Murai |
| 2003/0184436 A1 | 10/2003 | Seales et al. |
| 2003/0189928 A1 | 10/2003 | Xiong |
| 2004/0010472 A1 | 1/2004 | Hilby et al. |
| 2004/0010569 A1 | 1/2004 | Thomas et al. |
| 2004/0059821 A1 | 3/2004 | Tang et al. |
| 2004/0086093 A1 | 5/2004 | Schranz |
| 2004/0090968 A1 | 5/2004 | Kimber et al. |
| 2004/0105444 A1 | 6/2004 | Korotin et al. |
| 2004/0160956 A1 | 8/2004 | Hardy et al. |
| 2005/0027887 A1 | 2/2005 | Zimler et al. |
| 2005/0036590 A1 | 2/2005 | Pearson et al. |
| 2005/0074114 A1 | 4/2005 | Fotta et al. |
| 2005/0078681 A1 | 4/2005 | Sanuki et al. |
| 2005/0089018 A1 | 4/2005 | Schessel |
| 2005/0097222 A1 | 5/2005 | Jiang et al. |
| 2005/0105708 A1 | 5/2005 | Kouchri et al. |
| 2005/0141485 A1 | 6/2005 | Miyajima et al. |
| 2005/0169247 A1 | 8/2005 | Chen |
| 2005/0222820 A1 | 10/2005 | Chung |
| 2005/0238034 A1 | 10/2005 | Gillespie et al. |
| 2005/0259637 A1 | 11/2005 | Chu et al. |
| 2006/0007915 A1 | 1/2006 | Frame |
| 2006/0009240 A1 | 1/2006 | Katz |
| 2006/0013195 A1 | 1/2006 | Son et al. |
| 2006/0092011 A1 | 5/2006 | Simon et al. |
| 2006/0114894 A1 | 6/2006 | Cherchali et al. |
| 2006/0140352 A1 | 6/2006 | Morris |
| 2006/0156251 A1 | 7/2006 | Suhail et al. |
| 2006/0167746 A1 | 7/2006 | Zucker |
| 2006/0187898 A1 | 8/2006 | Chou et al. |
| 2006/0243797 A1 * | 11/2006 | Apte ................ G06Q 20/20 235/383 |
| 2006/0251048 A1 | 11/2006 | Yoshino et al. |
| 2006/0258341 A1 | 11/2006 | Miller et al. |
| 2006/0259767 A1 | 11/2006 | Mansz et al. |
| 2006/0268848 A1 | 11/2006 | Larsson et al. |
| 2007/0036314 A1 | 2/2007 | Kloberdans et al. |
| 2007/0037560 A1 | 2/2007 | Yun et al. |
| 2007/0041517 A1 | 2/2007 | Clarke et al. |
| 2007/0054645 A1 | 3/2007 | Pan |
| 2007/0061735 A1 | 3/2007 | Hoffberg et al. |
| 2007/0071212 A1 | 3/2007 | Quittek et al. |
| 2007/0118750 A1 | 5/2007 | Owen et al. |
| 2007/0121593 A1 | 5/2007 | Vance et al. |
| 2007/0121596 A1 | 5/2007 | Kurapati et al. |
| 2007/0132844 A1 | 6/2007 | Katz |
| 2007/0133757 A1 | 6/2007 | Girouard et al. |
| 2007/0153776 A1 | 7/2007 | Joseph et al. |
| 2007/0165811 A1 | 7/2007 | Reumann et al. |
| 2007/0183407 A1 | 8/2007 | Bennett et al. |
| 2007/0203999 A1 | 8/2007 | Townsley et al. |
| 2007/0223455 A1 | 9/2007 | Chang et al. |
| 2007/0283430 A1 | 12/2007 | Lai et al. |
| 2007/0298772 A1 | 12/2007 | Owens et al. |
| 2008/0049748 A1 | 2/2008 | Bugenhagen et al. |
| 2008/0075248 A1 | 3/2008 | Kim |
| 2008/0075257 A1 | 3/2008 | Nguyen et al. |
| 2008/0084975 A1 | 4/2008 | Schwartz |
| 2008/0089325 A1 | 4/2008 | Sung |
| 2008/0097819 A1 | 4/2008 | Whitman |
| 2008/0111765 A1 | 5/2008 | Kim |
| 2008/0125095 A1 | 5/2008 | Mornhineway et al. |
| 2008/0144625 A1 | 6/2008 | Wu et al. |
| 2008/0159515 A1 | 7/2008 | Rines |
| 2008/0168145 A1 | 7/2008 | Wilson |
| 2008/0196099 A1 | 8/2008 | Shastri |
| 2008/0225749 A1 | 9/2008 | Peng et al. |
| 2008/0247401 A1 | 10/2008 | Bhal et al. |
| 2008/0298348 A1 | 12/2008 | Frame et al. |
| 2008/0313297 A1 | 12/2008 | Heron et al. |
| 2008/0316946 A1 | 12/2008 | Capper et al. |
| 2009/0106318 A1 | 4/2009 | Mantripragada et al. |
| 2009/0135008 A1 | 5/2009 | Kirchmeier et al. |
| 2009/0168755 A1 | 7/2009 | Peng et al. |
| 2009/0213999 A1 | 8/2009 | Farrand et al. |
| 2009/0253428 A1 | 10/2009 | Bhatia et al. |
| 2009/0303042 A1 | 12/2009 | Song et al. |
| 2009/0319271 A1 | 12/2009 | Gross |
| 2010/0046530 A1 | 2/2010 | Hautakorpi et al. |
| 2010/0046731 A1 | 2/2010 | Gisby et al. |
| 2010/0098235 A1 | 4/2010 | Cadiz et al. |
| 2010/0114896 A1 | 5/2010 | Clark et al. |
| 2010/0136982 A1 | 6/2010 | Zabawskyj et al. |
| 2010/0191829 A1 | 7/2010 | Cagenius |
| 2010/0229452 A1 | 9/2010 | Suk |
| 2010/0302025 A1 | 12/2010 | Script |
| 2011/0054689 A1 | 3/2011 | Nielsen et al. |
| 2011/0111728 A1 | 5/2011 | Ferguson et al. |
| 2011/0140868 A1 | 6/2011 | Hovang |
| 2011/0170680 A1 | 7/2011 | Chislett et al. |

(56) References Cited

U.S. PATENT DOCUMENTS

| | | |
|---|---|---|
| 2011/0183652 A1 | 7/2011 | Eng et al. |
| 2011/0265145 A1 | 10/2011 | Prasad et al. |
| 2012/0027191 A1 | 2/2012 | Baril et al. |
| 2012/0036576 A1 | 2/2012 | Iyer |
| 2012/0099716 A1 | 4/2012 | Rae et al. |
| 2012/0284778 A1 | 11/2012 | Chiou et al. |
| 2012/0329420 A1 | 12/2012 | Zotti et al. |
| 2013/0018509 A1 | 1/2013 | Korus |
| 2013/0035774 A1 | 2/2013 | Warren et al. |
| 2013/0070928 A1 | 3/2013 | Ellis et al. |
| 2013/0293368 A1 | 11/2013 | Ottah et al. |
| 2013/0336174 A1 | 12/2013 | Rubin et al. |
| 2014/0022915 A1 | 1/2014 | Caron et al. |
| 2014/0084165 A1 | 3/2014 | Fadell et al. |
| 2014/0085093 A1 | 3/2014 | Mittleman et al. |
| 2014/0101082 A1 | 4/2014 | Matsuoka et al. |
| 2014/0120863 A1 | 5/2014 | Ferguson et al. |
| 2014/0169274 A1 | 6/2014 | Kweon et al. |
| 2014/0266699 A1 | 9/2014 | Poder et al. |
| 2014/0306802 A1 | 10/2014 | Hibbs, Jr. |
| 2015/0065078 A1 | 3/2015 | Mejia et al. |
| 2015/0086001 A1* | 3/2015 | Farrand ................ H04M 3/436 379/210.02 |
| 2015/0087280 A1 | 3/2015 | Farrand et al. |
| 2015/0100167 A1 | 4/2015 | Sloo et al. |
| 2015/0145693 A1 | 5/2015 | Toriumi et al. |
| 2015/0177114 A1 | 6/2015 | Kapoor et al. |
| 2015/0262435 A1 | 9/2015 | Delong et al. |
| 2015/0339912 A1 | 11/2015 | Farrand et al. |
| 2016/0012702 A1 | 1/2016 | Hart et al. |
| 2016/0078750 A1 | 3/2016 | King et al. |
| 2016/0142758 A1 | 5/2016 | Karp et al. |
| 2016/0277573 A1 | 9/2016 | Farrand et al. |

FOREIGN PATENT DOCUMENTS

| | | |
|---|---|---|
| WO | WO2015179120 A1 | 11/2015 |
| WO | WO2016007244 A1 | 1/2016 |

OTHER PUBLICATIONS

International Search Report and Written Opinion mailed Jul. 27, 2015 for App. No. PCT/US2015/029109, filed May 4, 2015, 12 pages.

International Search Report and Written Opinion mailed Nov. 2, 2015 for App. No. PCT/US2015/034054, filed Jun. 3, 2015, 15 pages.

Life Alert. "Life Alert's Four Layers of Protection, First Layer of Protection: Protection at Home." https://web.archive.org/web/20121127094247/http://www.lifealert.net/products/homeprotection.html. [retrieved Oct. 13, 2015], 4 pages.

International Search Report and Written Opinion mailed Jun. 30, 2016 for App. No. PCT/US2016/030597, filed May 3, 2016, 12 pages.

* cited by examiner

IDENTIFYING AND FILTERING INCOMING TELEPHONE CALLS TO ENHANCE PRIVACY

CROSS-REFERENCE TO RELATED APPLICATIONS

This application is a continuation-in-part of U.S. patent application Ser. No. 15/169,615, filed May 31, 2016, which in turn is a continuation of U.S. patent application Ser. No. 14/034,457 filed Sep. 23, 2013, now U.S. Pat. No. 9,386,148, issued Jul. 5, 2016. The disclosures of the above-reference patent applications are incorporated herein by reference in their entirety for all purposes.

TECHNICAL FIELD

This disclosure relates generally to privacy protection of telephone calls and, more particularly, to blocking of unwanted incoming telephone calls.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

With development of telephone communications, the number of parties offering services via telephone has increased. Telephone calls from these parties, such as telemarketers, pollsters, and charitable organizations, sometimes referred to as spam calls, robocalls, or junk calls, are typically unsolicited, placed in bulk and made indiscriminately. Telemarketers employ increasingly sophisticated technology to get their calls through to their target audience in spite of people's desire to be left alone. Furthermore, telemarketers can employ computers to dial a number until the call is answered, so they can automatically transfer the call to a human agent. This can be heard as a pause after the phone call is answered but before the called party can speak to the human agent.

Consumers can employ a variety of defenses against undesired callers. Some telephone services can allow anonymous call reject so that the phone does not ring if the caller Identification (ID) is blocked. Unfortunately, this strategy can prevent the receipt of calls from anyone who has set their outbound caller ID to be blocked in an attempt to maintain privacy. Legislation has been passed allowing consumers to opt out of receiving calls from telemarketers by adding their phone number to a national "do-not-call" list. However, the effectiveness of this list has been undermined by the fact that it does not apply to political organizations and charities, many telemarketers ignore the list, and the prohibition does not apply to any entity that has previously conducted business with the target. Some privacy protection techniques can employ a "whitelist" of known acceptable callers and a "blacklist" of known undesired callers, but blocking only blacklisted numbers often lets too many "junk" calls through due to the blacklist being incomplete, while allowing only calls from whitelisted numbers may be too restrictive. Moreover, managing blacklists and whitelists manually can be bothersome and often is not worth the effort.

In the meantime, computational power and network databases have advanced so much that a network operator can employ far more sophisticated and automated means for protecting privacy of the user more accurately and with minimal interaction with the user. Current methods of spam blocking are inadequate and a new approach to privacy protection is needed in the field.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various techniques for filtering telephone calls. Specifically, a method for filtering a telephone call may comprise receiving, from a caller, a telephone call directed to a communication device associated with an intended call recipient. The received telephone call may be scored based on predetermined scoring criteria to create a score indicative of a desirability of the telephone call. Furthermore, the method may comprise comparing the score to a predetermined threshold score. The method may further comprise selectively classifying, based on the comparison, the telephone call as an unwanted telephone call. Furthermore, the method may comprise selectively rejecting the unwanted telephone call.

According to another approach of the present disclosure, there is provided a system for filtering a telephone call. The system may comprise a processor. The processor may be configured to receive, from a caller, the telephone call directed to a communication device associated with an intended call recipient. The processor may be further configured to score the telephone call based on predetermined scoring criteria to create a score indicative of a desirability of the telephone call. Furthermore, the processor may compare the created score to a predetermined threshold score and, based on the comparison, selectively classify the telephone call as an unwanted telephone call. Furthermore, the processor may selectively reject the unwanted telephone call. The system may further comprise a memory unit configured to store data associated with the predetermined scoring criteria, the predetermined threshold score, a whitelist, and a blacklist According to a further approach, a method for filtering a telephone call is provided. The method may comprise: receiving from a caller the telephone call directed to a communication device associated with an intended call recipient, the Internet being disposed between a computer implementing the method and the communication device, the intended call recipient being in a structure; determining a state of the intended call recipient using telemetry received from at least one of a sensor and an appliance disposed in the structure; scoring the telephone call based on predetermined scoring criteria to create a score indicative of a desirability of the telephone call, the predetermined scoring criteria being provided by the intended call recipient, the predetermined scoring criteria including the state of the intended call recipient; comparing the score to a predetermined threshold score; classifying the telephone call as an unwanted telephone call using the comparison; and selectively rejecting the unwanted telephone call.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
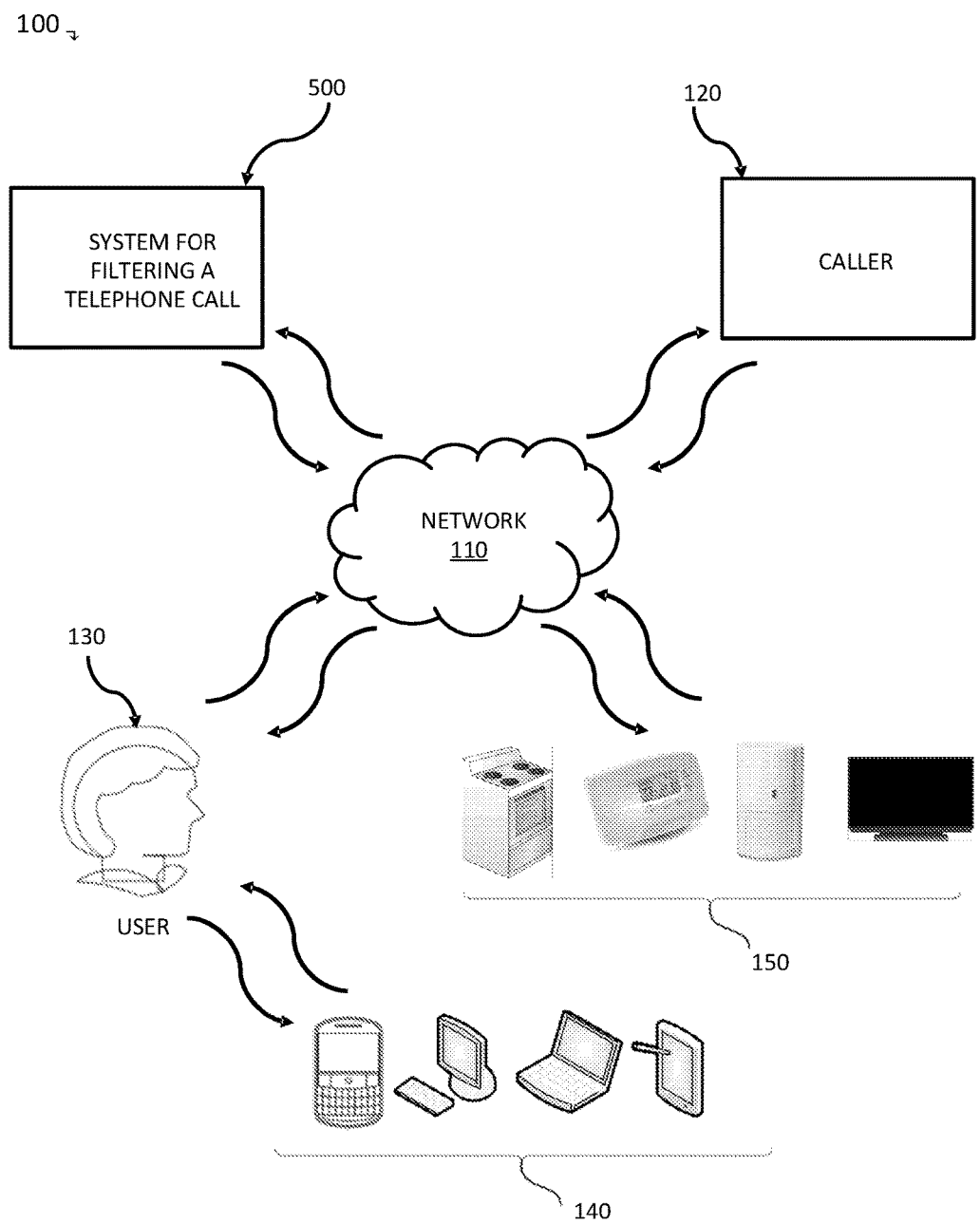
FIG. 1 shows an environment within which a method and a system for filtering a telephone call can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), video game console, handheld gaming device, cellular phone, smart phone, smart television system, and so forth.

As used herein, "telephone call" can refer to different types of communications sessions, such as various combinations of Short Message Service (SMS) message, instant messaging (IM) message, e-mail message, videotelephony, voice chat, web-based communications, a connection over a telephone network, and the like). Initiation of communications sessions and/or an instance of a communications session may be referred to as a "call." Videotelephony can be real-time audio and video communication (e.g., webcam, videophone, videoconferencing, and telepresence). Voice chat can be audible communications over a network such as the Internet (e.g., Skype, Yahoo! Messenger, AOL Instant Messenger, Windows Live Messenger, (online) video game (e.g., using a Voice over IP (VoIP) engine), and the like). A connection over a telephone network can include one or more of Plain old telephone service (POTS), Voice over IP (VoIP), mobile or cellular phone network, etc.). Web-based communications can include browser-to-browser applications for voice calling, video calling, peer-to-peer (P2P) file sharing, and the like, without the need of internal and/or external plugins, such as provided by an application programming interface (API) like Web Real-Time Communication (WebRTC).

As used herein, "telephone number" and/or "numbers" can refer to various combinations of contact identifiers. For example, a contact identifier can be at least one of a telephone number, personal name or full name (e.g., given name, middle name(s), surname, and combinations thereof), username, email address, screen name, handle, nickname, URL (Uniform Resource Locator), URI (Uniform Resource Identifier), SIP URI, and the like.

The present disclosure relates to a network-oriented, integrated and automated approach to avoid unwanted calls by exploiting the capabilities of a phone network and information from devices arrayed in and around a structure, and to provide sophisticated handling of incoming calls. As used herein, a structure can be a residential building, such as a castle, mansion, house, duplex, townhouse, apartment, condominium, and the like. In addition to user-defined blacklists (i.e., lists comprising numbers known to be associated with undesired callers) and whitelists (i.e., lists comprising numbers known to be associated with acceptable callers), the present disclosure implements processes for enhancing and automating creation of blacklists and whitelists and for scoring the likelihood of allowance of a call from an unfamiliar (but not anonymous) caller. The processes for creating or enhancing the lists, as well as the scoring of calls, can be augmented by sensor information—obtained either from dedicated sensors and/or sensors embedded in other devices (appliances)—and from state information obtained from the other devices (appliances). The resulting scores may be used to provide the user with a control over calls from unfamiliar callers.

Various criteria may be used to score calls. For example, call desirability may be assessed based on network statistics gathered across the entire user base of the network, community whitelists and blacklists, and callbacks. Furthermore, machine detection may be employed to determine whether the caller is an automated system or a human. In an example embodiment, customized challenge and response may be used to provide the user with an opportunity to determine whether unfamiliar callers are known to the user and whether calls from the unfamiliar callers should be put through or blocked.

Sensor and state information from sensors and appliances around the structure can be further used as input to score calls. For example, desirability of calls may be different if sensors and/or state allow the system to determine that the called one or more occupants of the structure is sleeping, eating dinner, or engaged in an activity that the user has indicated is a "do not disturb" activity.

The proliferation of modern "home" automation systems, security systems and Internet of Things (IoT) devices can result in homes, businesses, and other structures being equipped with numerous network accessible sensors. Additionally, other network accessible devices (and/or appliances)—even those not explicitly equipped with sensors—may provide indirect information about the occupants of a structure based on state information available from such devices.

Sensors may include purpose-built sensors, intended specifically to provide telemetry of certain factors in or about a structure. Examples of purpose-built sensors include network equipped thermometers, moisture sensors, hygrometers, and similar equipment. These may be intended to have information that is read or interpreted by humans, but often also provide programmatic mechanisms such as Application Programming Interfaces (APIs) that allow this information to be accessed by software.

Numerous devices (referred to as appliances) often incorporate sensors that may be useful for providing similar information even in the absence of purpose-built sensors. WiFi (network) accessible, programmable thermostats to control climate control systems are available. Such devices incorporate both thermometers (for determining temperature) and motion sensors, used to determine if occupants are present and active. Alarm systems are often equipped with numerous sensors capable of providing information about motion (or lack thereof) of occupants of the structure, indications when windows or doors are open, when moisture is present, etc. Alarm systems may make their information available programmatically via APIs, allowing this information to be accessed for use by other applications.

There is another category of devices that may provide useful information about occupant status despite not being explicitly equipped with (purpose-built) sensors. Many consumer devices are accessible via API, and one or more states of the device can be obtained. As an example, a consumer electronics device may be queried to determine if the device is powered on, or when it last interacted with the consumer (e.g., received input from a user). This can be used to determine if a consumer is active, in which room or rooms the consumer may be, and what activities they may be engaged in, even if the device does not feature sensors to measure these properties directly.

Thus, as a result of filtering a telephone call directed to privacy protection of the user, the call may be either rejected or put through to the user. During the scoring process, callers can be added to the community blacklist or whitelist or to a personal blacklist or whitelist of the person being called. If the call is put through, the system may provide the user with a user interface to allow the system to add the caller to the blacklist or the whitelist to streamline handling of calls from the same caller in the future. Alternatively, additions to the blacklist and whitelist may be automated based on programed rules prescribing flow of the call through the privacy protection system. Individual blacklists and whitelists may serve as resources to help determine the routing of future calls from the same callers to other users of the network. Additionally, preventive actions may be performed with regard to the undesired callers, such as automatically logging a complaint to an authority responsible for telephone call privacy identifying the caller as violating provisions related to the national "do-not-call" list. For the calls rejected by the system, the user may have several options for treating those calls to maximize the cost to the caller for having called, thereby increasing the chances that the caller will not call again and providing a measure of satisfaction to the user.

Referring now to the drawings, FIG. 1 illustrates an environment 100 within which a system and a method for filtering a telephone call can be implemented. The environment 100 may include a network 110, a system 500 for filtering a telephone call, a caller 120, and a user 130 being an intended call recipient and having one or more user communication devices 140. Additionally, one or more network accessible sensors and/or appliances 150 can be connected to network 110. These may include motion sensors or other alarm system components, intelligent thermostats, consumer electronic devices/appliances, network-aware home appliances (by way of non-limiting example, oven, stove, refrigerator, clothes washer, clothes dryer, and the like), heating, ventilating, and air conditioning (HVAC) units, etc.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1, or E3 line, Digital Data Service (DDS) connection, DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication. Furthermore, the network 110 may include a telephone network, such as a voice over Internet Protocol (VoIP) network.

The user communication device 140 may include a mobile phone, a smartphone, a tablet Personal Computer (PC), a laptop, a PC, and so forth. For the purposes of communication, the user communication device 140 may be compatible with one or more of the following network standards: GSM, CDMA, Long Term Evolution (LTE), (IP Multimedia Subsystem) IMS, Universal Mobile Telecommunication System (UMTS), 4G, 5G, 6G and upper, Radio-Frequency Identification (RFID), and so forth.

As shown, the caller 120 may perform a telephone call to the user communication device 140 via the network 110. The system 500 may be associated with the user communication device 140 to filter telephone calls from unwanted callers.

Figure 2:
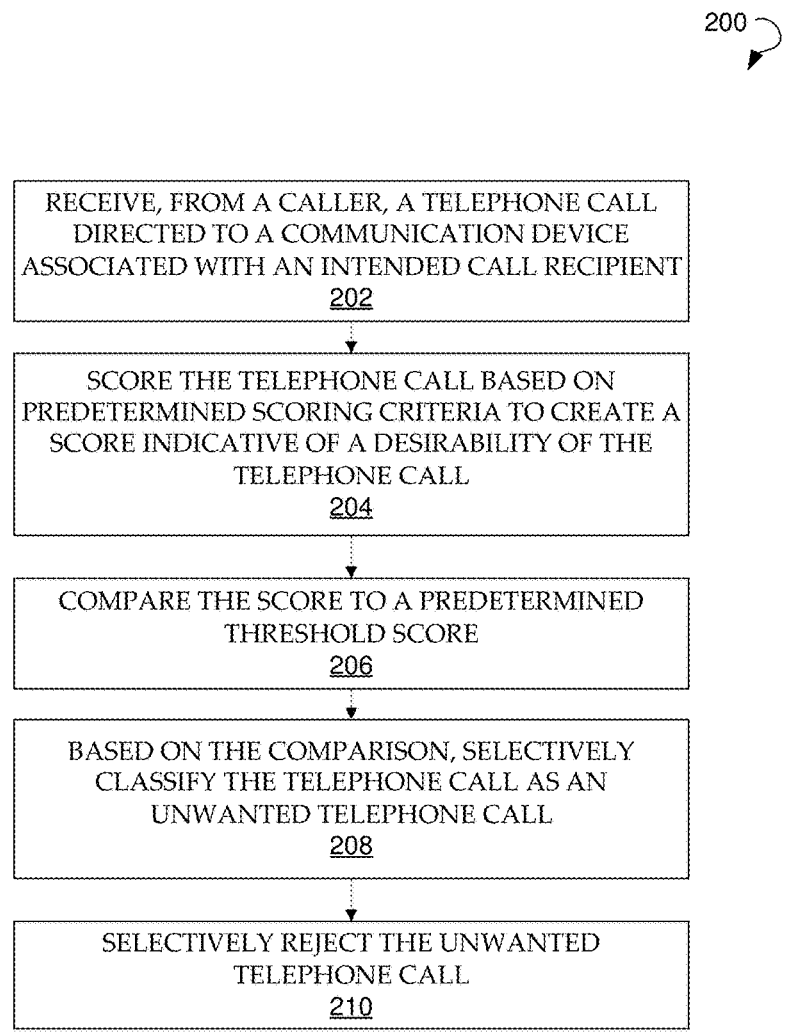
FIG. 2 is a process flow diagram showing a method for filtering a telephone call, according to an example embodiment.

FIG. 2 is a flow chart illustrating a method 200 for filtering a telephone call, in accordance with an example embodiment. The method 200 may be performed by processing logic that may comprise hardware (e.g., decision making logic, dedicated logic, programmable logic, and microcode), software (such as software run on a general-purpose computer system or a dedicated machine), or a combination of both.

In the example shown, the method 200 may commence at operation 202 with receiving, by a processor, from a caller, the telephone call directed to a communication device associated with an intended call recipient. The method 200 may continue with operation 204, at which the processor may score the telephone call based on predetermined scoring criteria. Predetermined scoring criteria may include combinations of: sensor information from network accessible sensors, sensors incorporated into network accessible appliances, and the state of various network accessible appliances. The scoring criteria and information can be used to create a score indicative of a desirability of the telephone call.

In an example embodiment, the scoring may be based on whether a caller or a caller communication device is associated with a whitelist, a blacklist, or a graylist. Furthermore, the scoring may be based on a number of calls made to different phone numbers by the caller, sequence of the calls made by the caller, and call sources. The predetermined scoring criteria may involve network statistics, machine detections, customized challenge and response, and so forth. In some embodiments, the predetermined scoring criteria may be provided by the intended call recipient.

In various embodiments, a (predefined) condition, status, and/or state of one or more occupants of a structure is determined. In another example embodiment, a network motion sensor (e.g., a portion of an alarm system or incorporated into a smart thermostat) may be used to determine that an occupant is believed to be home and that occupant has moved into a bedroom and become stationary, indicating the occupant is asleep. In another example embodiment, various combinations of timing information, sensor, and state information are used to extrapolate information about the status of an individual in a structure. For example, if it is determined that several cooking appliances were in the on state recently, and a motion sensor in the kitchen or dining room indicates activity/presence, the system may determine that the occupant is eating dinner.

By way of further non-limiting example, an audio/video receiver (AVR) (other components such as an audio/video source, display, and the like) being powered up may indicate one or more occupants is watching a movie, television, and the like. An AVR can receive audio and video signals from a number of audio/video sources (e.g., cable/satellite set-top box, radio, DVD player, Blu-ray Disc player, video game console, and the like) and process them to drive loudspeakers and a display (e.g., television, video monitor, video projector, and the like). In at least some of the above examples, the scoring criteria may adjust the score to reflect a status of one or more occupants (e.g., sleeping, eating dinner, watching a movie or television, and the like).

By way of additional non-limiting example, a special mode can include a guest mode, when an occupant/called party is entertaining a guest. In some embodiments, sensor data from transducers (e.g., microphone in at least one of a (cordless) telephone, computer, video game console, handheld gaming device, cellular phone, smart phone, smart television system, security system, and the like) is processed to detect unfamiliar voices (e.g., voice recognition recognizes the occupant/called party and determines there is a voice present—in proximity (e.g., in the same room/section of the structure) to at least one occupant—that is not recognized). For example, the voice recognition system is trained to recognize (identify) voices associated with the occupants. The scoring criteria may adjust the score to reflect that guests or other individuals that are not the occupants are present in the structure and that at least one occupant (i.e., occupant(s) in the same room/section of the structure as the unrecognized voice) is unavailable.

At operation 206, the processor may compare the created score to a predetermined threshold score. In an example embodiment, the predetermined threshold score may be selected by the intended call recipient or set by the processor. The method 200 may continue to operation 208, at which, based on the comparison, the processor may selectively classify the telephone call as an unwanted telephone call.

At operation 210, the processor may selectively reject the unwanted telephone call. In an example embodiment, the telephone call may be automatically rejected if a caller ID associated with the telephone call is blocked or the call is anonymous. In an example embodiment, the method 200 may optionally comprise, based on the score, putting the telephone call through to the communication device. Alternatively or additionally, the telephone call may be forwarded to a voicemail system to an alternate party or number, or in some other way handled in a way that does not disturb the called party. As described above, some embodiments of a telephone include various combinations of Short Message Service (SMS) message, instant messaging (IM) message, email message, videotelephony, voice chat, web-based communications, a connection over a telephone network, and the like.

Furthermore, based on the score, the caller or a caller communication device may be added to a whitelist or a blacklist. In an example embodiment, the intended call recipient may manually add the caller or caller communication device to the blacklist or the whitelist. Whitelists and blacklists may be global, or may be peculiar to a certain state indicated by the sensors and/or state of appliances. For example, a call from a parent, spouse, child, or close friend may be added to a global whitelist to allow access at all times. A call from a work colleague may be added to a specific "sleeping" or "eating dinner" blacklist, while not added to the global blacklist, allowing the call to be received during a more convenient time.

In an example embodiment, the method 200 may optionally comprise providing screening of the telephone call by the intended call recipient to allow the intended call recipient to manually reject or allow the telephone call. Furthermore, the intended call recipient may be allowed to grade the telephone call or effectiveness of the screening after the telephone call is completed.

Figure 3:
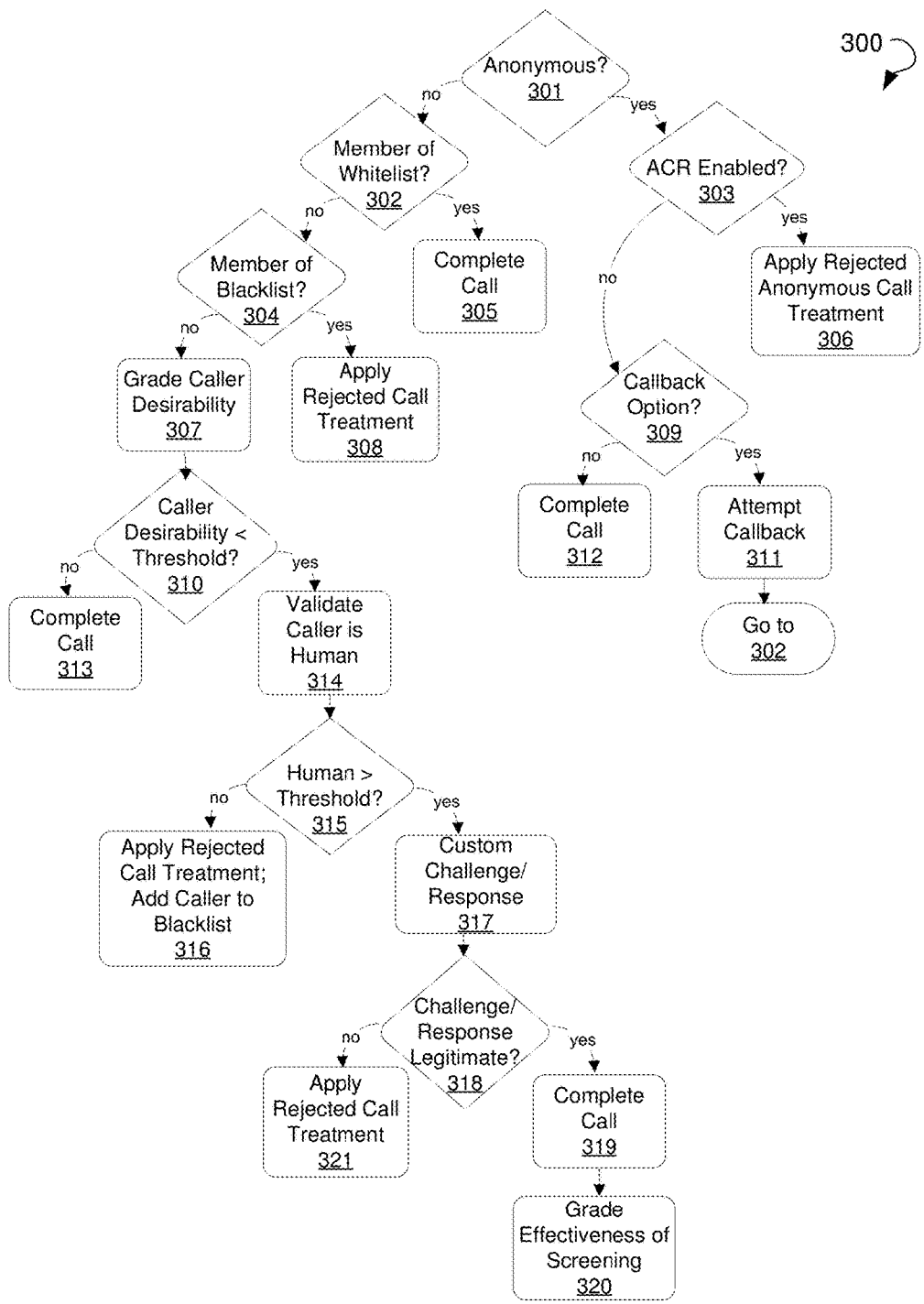
FIG. 3 is a flow chart showing handling of an inbound call, according to an example embodiment.

In an example embodiment, the method 200 may comprise automatically requiring a call back number to complete the telephone call. In an example embodiment, the method 200 may optionally comprise providing a test to establish whether the caller is a human. The method 200 is further illustrated in detail in FIG. 3 showing a method 300 for handling of an inbound call. The inbound call may include a call from a caller to an intended call recipient before being put through to the intended call recipient and before being rejected.

In a telephone network, such as a VoIP network, at step 301 it may be determined that the caller ID associated with the inbound call is blocked or anonymous. In such a case, at step 303, it may be ascertained whether the intended call recipient has enabled anonymous call reject (ACR). In case the intended call recipient has enabled ACR, the call may be rejected at step 306. If, on the other hand, the intended call recipient has not enabled ACR, it may be ascertained, at step 309, whether further screening, namely a callback option, is enabled by the intended call recipient. If the callback option is not enabled for the inbound anonymous calls, the call may be completed at step 312. In some example embodiments, if it is determined, at step 309, that the callback option is not enabled for the inbound anonymous calls, method 300 may proceed to step 307 (described below) instead of completing the call directly.

If further screening is desired, the call flow may be passed to step 311 where a callback may be attempted. In this case, the call may be answered and the caller asked by an interactive voice response system (IVR) to provide a number at which the caller may be reached. Typically, undesired callers, such as telemarketers, may not have direct phone numbers at which they can be reached. Therefore, requiring the callback may help in overcoming spam attempts. In case of receiving the number at which the caller may be reached, the current call may be ended and the process may proceed with step 302 described below.

It is important to note that for telephone networks in general, and VoIP networks in particular, functions such as callbacks and IVRs can be implemented without tying up the phone line of the intended call recipient or inhibiting the use of the service by the intended call recipient. From the perspective of the intended call recipient, a system for filtering a telephone call may operate in the background and in general may be invisible to the intended call recipient.

For an inbound call where a caller ID may be available (or where a callback number has been obtained), the whitelist of previously identified acceptable callers of the intended call recipient may be queried at step 302. If the caller is on the whitelist, the call may be completed at step 305. If the caller is not on the white list, the blacklist associated with the intended call recipient may be queried at step 304. A call from the callers on the blacklist may be rejected at step 308. For the callers who are neither on the whitelist nor on the blacklist, the desirability of the caller can be established in step 307. In step 307, the call may be answered by the automated system with a greeting such as 'Who is calling?' The system purposely may have a short greeting asking a question so that it may measure the pause between the connecting of the call and the first words of the caller. If the pause is three seconds or longer, the call may be connected by an auto dialer and the telemarketer may never hear the greeting from the system. If the caller responds with 'Hello' it may be an indication that he did not hear the question because of the time lag introduced by the auto dialer. This may be the first measurement to be considered in grading the desirability of the caller. The desirability of the caller may be scored, and the resulting score may be compared with a predetermined threshold score at step 310. The predetermined threshold score may be defined by the system or selected by the intended call recipient. If the desirability score of the caller is higher than the predetermined threshold score, the caller may be classified as a desirable caller and the call may be put through to the intended call recipient at step 313. (See FIG. 8 and discussion below for further details of the desirability rating.)

At step 314, if the desirability score of the caller is below the predetermined threshold score, the intended call recipient may configure the system to provide further assurances that the call is worth taking by attempting to determine whether the caller is human and not an automated system. In an example embodiment, the determining whether the caller is human may be based on the IVR asking the caller to add two numbers. The score indicative of whether the caller is human may range from 1-100. This score may be used at step 315 to determine whether to reject the call. If the score associated with the caller fails to exceed the threshold score value of step 315, the call may be rejected and the caller may be added to the blacklist at step 316.

If the caller is determined to be human, the system may be configured to issue a customized challenge/response at step 317 to determine whether the caller should be allowed to complete the call. The customized challenge/response, employing the IVR and call recording mechanism, may be used to determine whether the caller is an acquaintance of the intended call recipient or to classify the caller as an undesired caller, such as a collection agent or a solicitor. The interactions of the challenge/response may be recorded for future use in documenting the violation by the caller of the rules related to the national "do-not-call" list. A customized challenge/response may comprise the IVR asking a question or series of questions of a personal nature that could only be answered by an acquaintance of the intended call recipient. The answer may require personal knowledge of the intended call recipient that an undesired caller, such as a telemarketer, may not possess. A small number of such questions could determine familiarity and, therefore, legitimacy of the caller at step 318. A call from an illegitimate caller may be rejected at step 321, while a call from a legitimate caller may be put through to the intended call recipient at step 319. With proper whitelist handling, only one pass through the question and answer process may be required for any legitimate caller. For subsequent calls from that caller, the whitelist may identify the caller as legitimate and the call may be connected without delay.

At step 320, once the call has been completed via any path through step 307, the intended call recipient may be given an opportunity, through an intended call recipient interface, to grade effectiveness of the screening. This feedback may allow the intended call recipient to put the caller onto a personal whitelist or blacklist in order to streamline processing of future calls from that caller.

Figure 4:
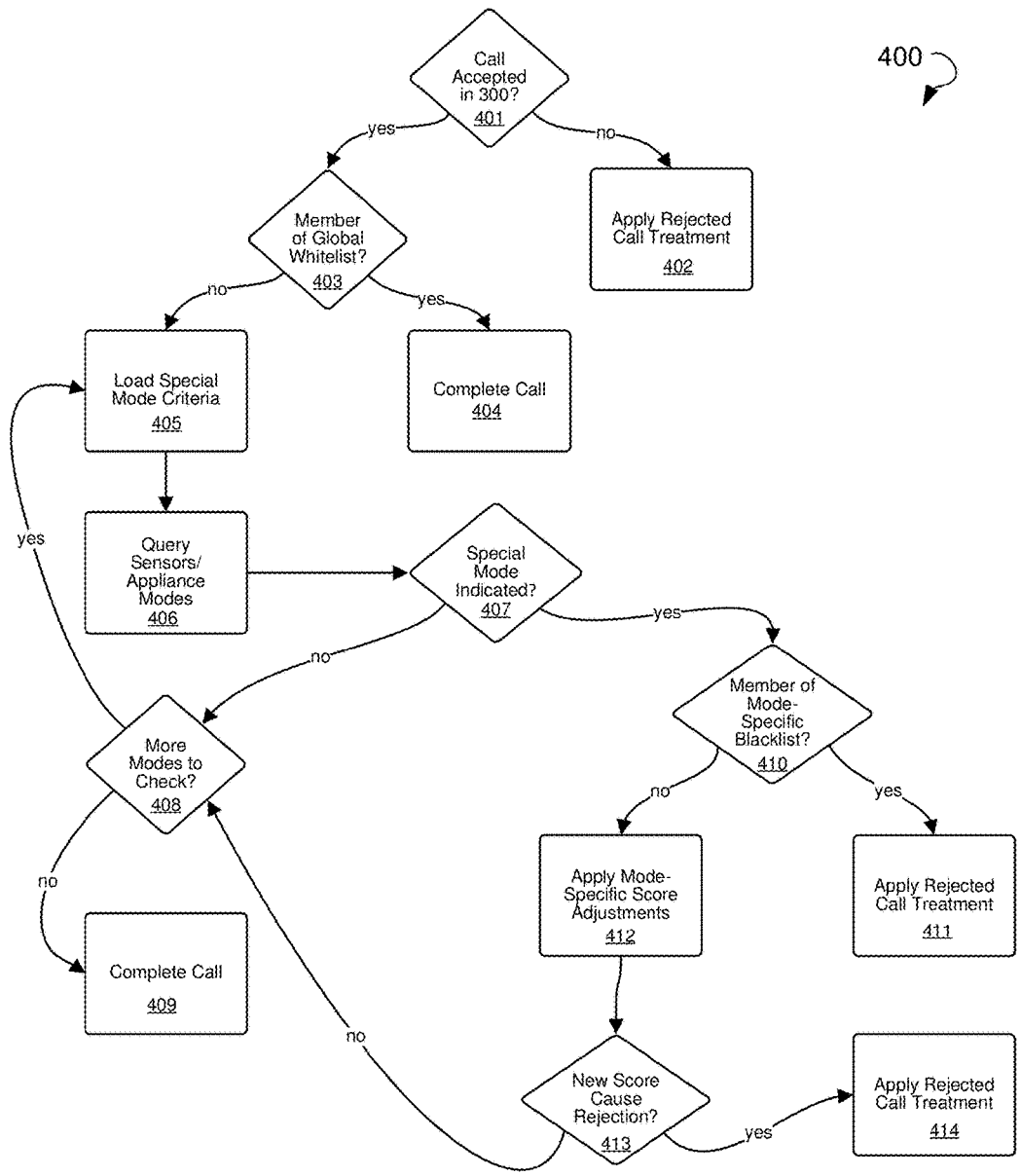
FIG. 4 is a flow chart illustrating handling of an inbound call based on a mode, according to an example embodiment.

Embodiments of method 200 are further illustrated in FIG. 4, including method 400 for handling an inbound call using combinations of sensor information and state information about network appliances. A user (not shown in FIG. 4) may define one or more user "modes" or "states" (e.g., sleeping, eating, consuming media such as watching television/movie, and the like) pertaining to at least one of the structure, occupant, or a called party, such that the mode(s)/state(s) can be determined from combinations of the sensor data (e.g., standalone sensors and/or sensors from network connected appliances) and state information from network appliances. The sensor data and/or state information can be referred to as telemetry. There may be multiple criteria that cause a mode/state to be entered/determined. For example, the "eating dinner" mode may be indicated if the oven has been on in the last 20 minutes, or if the breakfast room indicates motion, or if the dining room indicates motion. The user may define multiple modes/states, each with one or more criteria for entering that mode/state, and each with its own (mode/state specified) blacklist and (predetermined) threshold adjustment factor.

Method 300 discussed above in relation to FIG. 3 may be—in whole or in part—performed at step 401. In some embodiments, when the call would otherwise have been accepted/completed at states 305, 312, 313, or 319, additional testing can be performed, for example, beginning at step 403. When the call would have been rejected in process 300, it can be rejected at step 402 by applying a rejected call treatment. In some embodiments, method 400 may be, but need not be, a separate process from method 300. For example, method 400 may be integrated into process 300. Method 400 is discussed in the context of a separate process purely for illustrative purposes.

At step 403, the call can be checked to see if it is on the global whitelist. If so, sensor and state information may not be used, and the call may be accepted and completed at step 404. In some embodiments there is no check if the caller is on a global blacklist, since only accepted calls may be passed from process 300 to process 400 for further screening.

At step 405, criteria for entering a special mode (e.g., sleeping, eating, etc.) can be loaded, in order to determine when sensor data indicates entering the special mode. At step 406, the sensor(s) and state data from the various appliances are obtained, so that a test can be performed at step 407 to determine if a special mode is indicated and the call should be checked again.

If the sensor and/or state data do not support a determination that the structure/occupant/called party is in the special mode at step 407, then a check can be performed to see if there are additional special modes that can be checked at step 408. If there are additional modes, method 400 can repeat steps 405-407, such that the new mode is loaded, and sensors and/or state are checked to see if they indicate the structure/occupant/called party are in the new mode. If no more modes are defined, the call can be completed at step 409.

While provided for illustrative purposes, in various embodiments steps 406 and 407 are not performed during call screening. For example, another process may (continuously or at certain intervals) monitor the sensors and/or state, and determine which mode(s) the structure/occupant/called party is in. In that case, steps 406 and 407 may check if that mode is active (e.g., entered).

When a special mode is indicated at step 407, control to check the call based on being in that state can begin at step 410. The caller can be checked against a special mode-specific blacklist at step 410. When the caller is indicated as blacklisted in this state, rejected call treatment can be applied at step 411.

When the caller does not appear on a mode-specific blacklist for this mode, at step 412 the call desirability score or tests may be adjusted by a factor. In some embodiments, the adjustment varies depending on the mode. Sleep, for example, may be considered less interruptible than an eating dinner or watching movie state. These adjusted scores or tests can be used at step 413 to determine if the call is rejected. A simple modification of the score (multiplier) and a simple test are indicated by way of example and not limitation. In various embodiments, multiple tests may be performed with different score modifiers. For example, as shown in FIG. 3, a desirability threshold, a human threshold, and a challenge response threshold each could be modified in a different way by the mode-specific adjustment. Additionally or alternatively, at least one of the score, the criteria, and the tests applied could be changed.

When the call is still deemed desirable at step 413, control can proceed to step 408 to determine if additional mode-specific tests are indicated before rejecting the call. When the call is determined to be undesirable, call rejection treatment can be applied at step 414.

Figure 5:
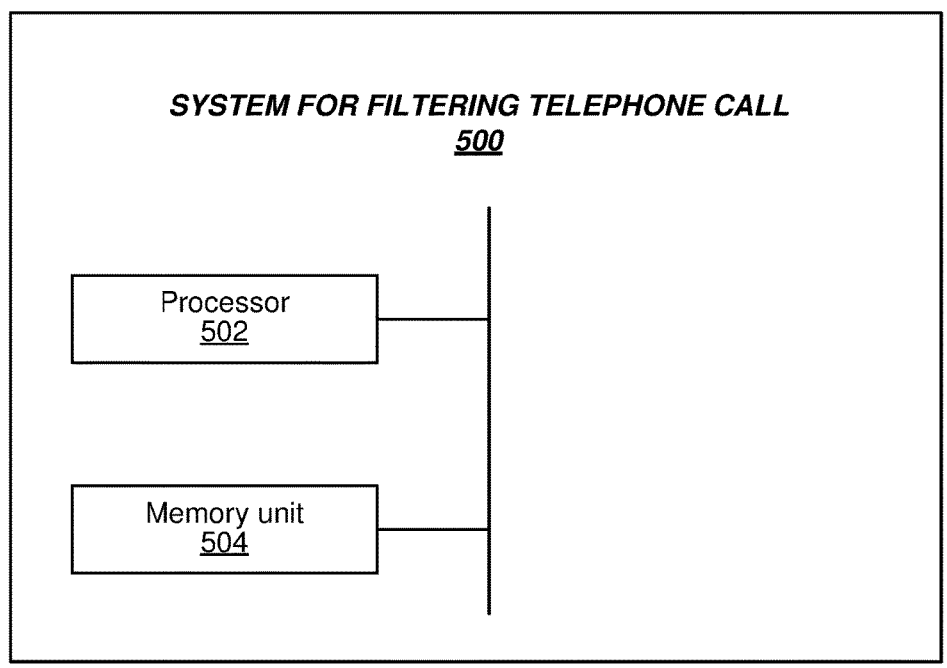
FIG. 5 is a block diagram showing various modules of a system for filtering a telephone call, according to an example embodiment.

FIG. 5 is a block diagram showing various modules of an exemplary system 500 for filtering telephone calls. Specifically, the system 500 may include a processor 502. The processor 502 may be configurable to receive a telephone call from a caller directed to a communication device associated with an intended call recipient. The processor 502 may score the received telephone call based on predetermined scoring criteria and create a score indicative of a desirability of the telephone call. The processor 502 may further compare the score to a predetermined threshold score. The predetermined threshold score may be selected by the intended call recipient or set by the processor 502. Based on the comparison, the processor 502 may be configured to selectively classify the telephone call as an unwanted telephone call and to selectively reject the unwanted telephone call.

In an example embodiment, the processor 502 may be configured, based on the score, to selectively classify the telephone call as a wanted telephone call and put the telephone call through to the communication device of the intended call recipient. In an example embodiment, the processor 502 may be configured, based on the score, to add the caller or a caller communication device to the whitelist or the blacklist.

In an example embodiment, the processor 502 may be configured to automatically require a call back number to complete the telephone call. If the caller is unable to provide a call back number, the processor 502 may be configured to reject the call.

In an example embodiment, the processor 502 may be configured to provide a test to establish whether the caller is a human. If the caller passes the test, the processor 502 may put the call through to the intended call recipient. If the caller fails the test, the processor 502 may reject the call.

In a further example embodiment, the processor 502 may be further configured to provide screening of the telephone call by the intended call recipient to allow the intended call recipient to manually reject or allow the telephone call. The intended call recipient may be further allowed to grade the telephone call or effectiveness of the screening after the telephone call is completed.

In various embodiments, the processor 502 may perform all or combinations of method 200 (FIG. 2), method 300 (FIG. 3), and method 400 (FIG. 4).

The system 500 may comprise a memory unit 504 configured to store data associated with the predetermined scoring criteria, the predetermined threshold score, a whitelist, a blacklist, and so forth.

Figure 6:
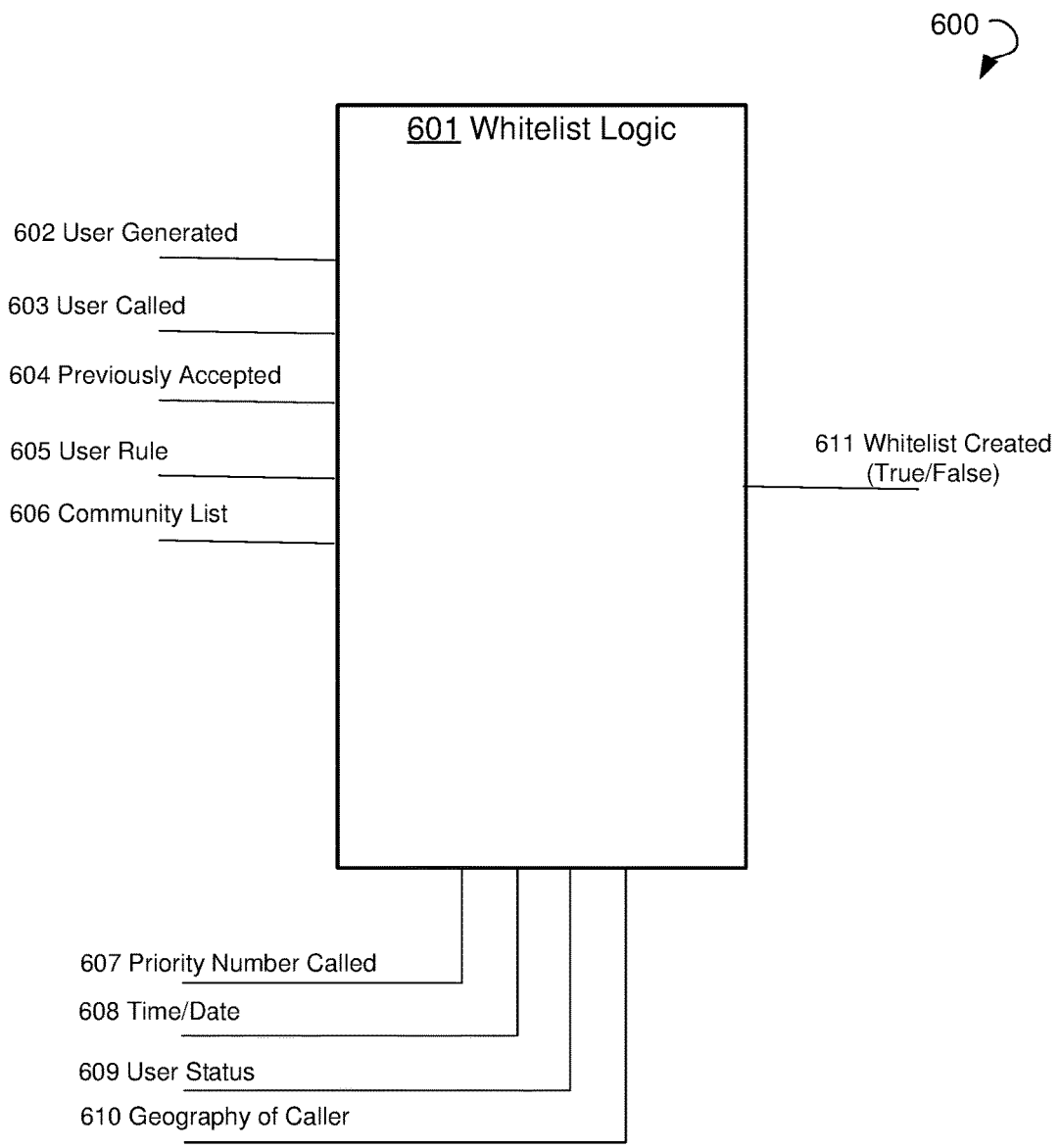
FIG. 6 is a flow chart showing logic for creating a whitelist, according to an example embodiment.

FIG. 6 shows a flow chart 600 illustrating how the whitelist may be composed and evaluated for driving the decision in step 302 of FIG. 3. The whitelist may consist of numbers from which a user (i.e., an intended call recipient) wishes to receive calls. The user may be given several options as to what numbers may be included in the whitelist. Alternatively, the system 500 may be configured with a set of predetermined options for including a number in the whitelist. The list of options may include user generated numbers 602 (i.e., the numbers that the user enters as permitted numbers). Furthermore, the list of options may include numbers previously called by the user 603. The list of options may further include previously accepted numbers 604 (i.e., the numbers from callers whose calls were previously accepted by the user and were not subsequently removed from the whitelist or blacklisted). Furthermore, the list of options may include user rule numbers 605 (i.e., numbers from particular geographic locations, area codes or number wildcards, e.g., calls from a home town of the user, as determined by the area code). The list of options may comprise community list numbers 606 (i.e., numbers present in a public list).

The list of options may further include numbers calling special phone numbers 607 to which the user may give priority. For example, a user may have a virtual number that the user may provide to family or acquaintances known to be legitimate. The calls to this number may bypass the screening process entirely even for unfamiliar or blocked calling numbers.

FIG. 6 shows how various whitelists can be qualified against time/date criteria 608, such as time of day, day of week, or time of year; geographic location 610 of the caller as determined by the caller ID; or user status 609. These various lists and criteria may be combined in logic block 601 to produce a decision 611 as to whether the caller should definitely be allowed to complete the call.

Figure 7:
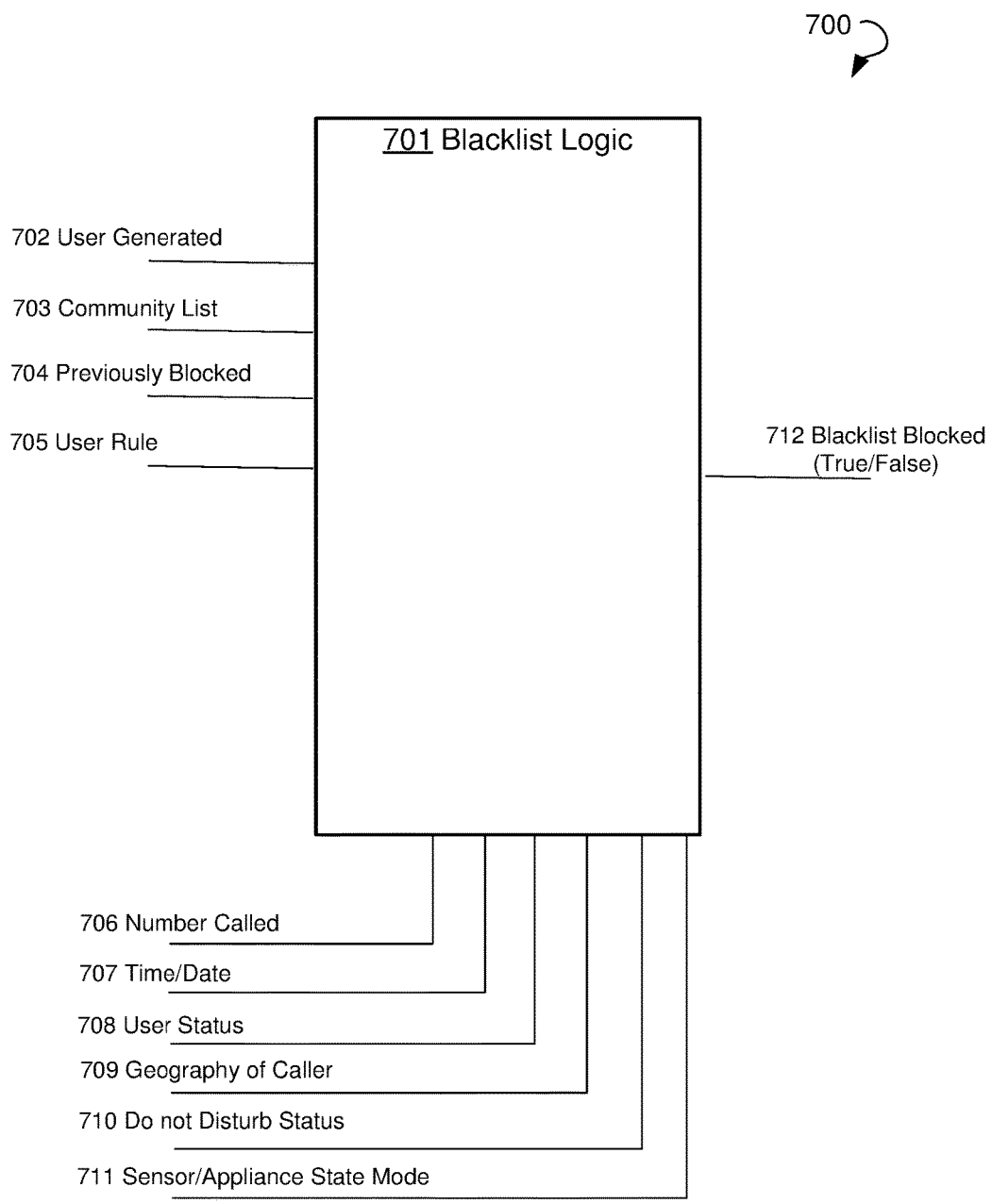
FIG. 7 is a flow chart showing logic for creating a blacklist, according to an example embodiment.

FIG. 7 shows a flow chart 700 illustrating how the blacklist may be composed and evaluated for driving the decisions of step 304 of FIG. 3 and/or step 410 of FIG. 4. The blacklist may consist of caller numbers associated with callers from whom the user may not want to receive calls. The user may be given several options for what numbers may go into the blacklist. The list of options may include user generated numbers 702 (i.e., numbers that the user may enter as blacklisted). The list of options may further include community list numbers 703 (i.e., numbers entered in a community blacklist that may be generated by the network operator or crowd-sourced from a community of users). The community blacklist may include undesired numbers from multiple sources, including numbers known to be used for calls to large numbers of subscribers in the network. Most residential telephone users may call fewer than 20 different numbers in a given month. Therefore, an inbound caller who has called, for example, 100 or even 1,000 different numbers on a single telephone network in a given month can reasonably be classified as a spam caller. Furthermore, the community blacklist may include numbers known from network calling records to be used for calling phone numbers in sequence.

In an example embodiment, the community blacklist may include numbers blacklisted in multiple blacklists of individual users, numbers found in global blacklists published by third party or public sources, and numbers that have previously called "honeypot" numbers. The "honeypot" numbers may be designed by the network operator to entice telemarketers and other undesired callers to call and engage in a manner which allows their intent to be revealed. For example, certain unassigned phone numbers may be connected to an IVR system which pretends to be a live caller asking a question. The IVR may then measure the pause before the caller responds, which may often be longer than usual when an automated telemarketing system connects the call. If the response detected does not begin with a predetermined phrase, then it may be concluded that the caller may not have heard the question due to the lag typically seen in automated dialers between call connection and an agent joining the call. This may mean that the caller may be an undesired caller, such as a telemarketer, and that the number should be blacklisted. Numbers that are known to have been out of service for a long time are also effective "honeypots" to attract undesired callers as it can be reasonably guessed that anyone calling a number that has been out of service for a long time may be either an undesired caller or has misdialed.

The list of options may further include previously blocked numbers 704 (i.e., numbers that have been previously blocked by the user). Furthermore, the list of options may include user rule numbers 705 (i.e., numbers from particular geographic locations, area codes or number wildcards for which the user has created a rule that causes them to be blocked).

Furthermore, the list of options may include numbers calling special phone numbers 706 that the user may provide only to persons from whom the user may never want to receive calls or whose calls would be sent directly to voicemail, and so forth. For example, such a number may be provided to a person with whom the user may not wish to continue a relationship.

FIG. 7 shows how the various blacklists can be further qualified by time of day, day of week, time of year 707, user status 708 provided by the user, or geographic location 709 of the caller as determined by the caller ID. A function can be generalized and integrated with a Do Not Disturb 710 function to give users greater control over their privacy. Do Not Disturb 710 can be further customized with a scheduling system that may identify personal preferences as to when calls may or may not be accepted. Once a call has passed the rejection tests, the call may be compared to the schedule before completion. The calls outside the assigned time windows may have their destination assigned in the same fashion as rejected calls or may be forwarded to a voicemail. The scheduled Do Not Disturb may have an Always OK list to allow certain numbers to call outside the scheduled times. A function can be included in Sensor/Appliance State Mode 711 which considers the current mode, as described earlier. This function can allow certain telephone numbers (e.g., the mode-specific blacklists) to be included in the blacklist when certain modes are detected based on the sensors and/or state of appliances. The various lists and criteria may combine in logic block 701 to produce a decision 712 as to whether the caller may definitely be prevented from completing the call.

Figure 8:
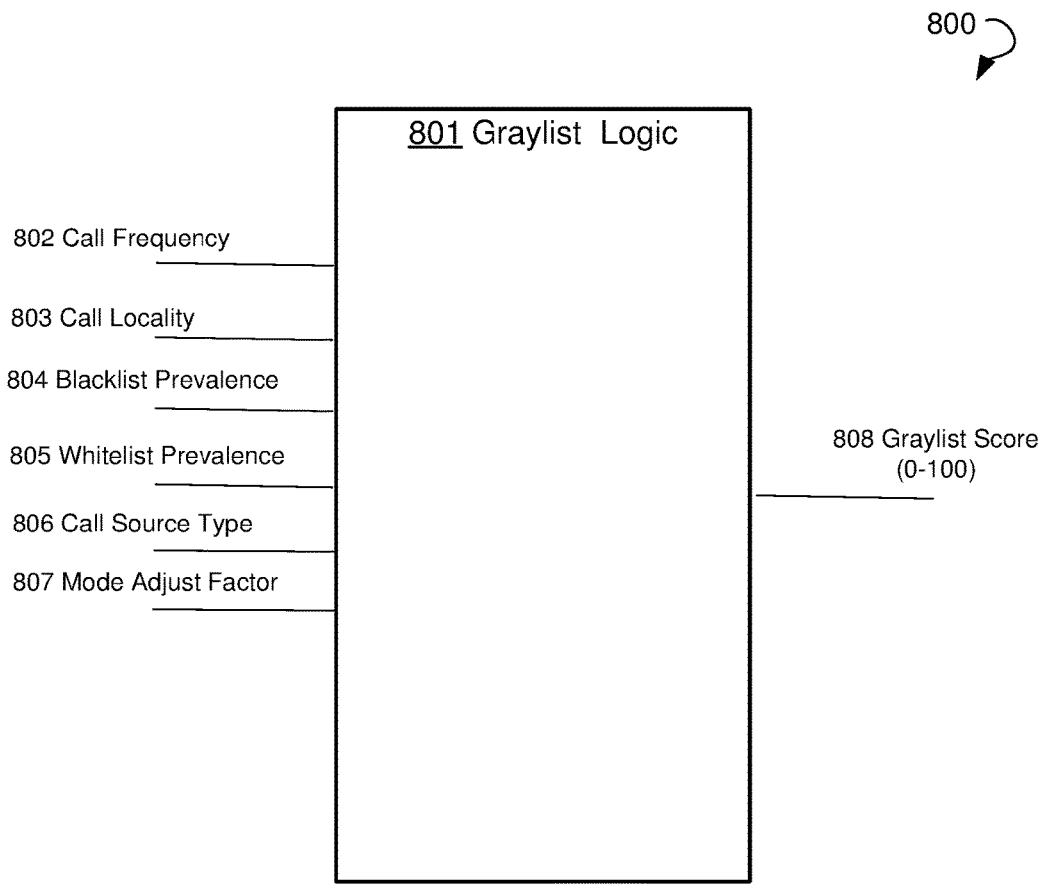
FIG. 8 is a simplified block diagram depicting logic for creating a graylist, according to an example embodiment.

FIG. 8 shows a simplified block diagram of logic 800 for grading and assigning a score to callers, who are neither whitelisted nor blacklisted, to determine if calls from the callers may be put through to the user. Unlike the definitive judgments made by the whitelist logic of FIG. 6 or blacklist logic of FIG. 7, the assessment of FIG. 8 may be considered as a "graylist" logic 801 in which judgment is not binary. Factors that affect the graylist score 808 or caller desirability score may be heuristic and dependent upon a wide variety of data sources, some of which were mentioned previously and which may also drive the whitelist or blacklist judgments (where the user has chosen to treat them as if they were binary factors). For example, some users may take an aggressive view toward any number that has called a honeypot and simply disallow calls from those numbers. Other users may choose not to include that factor in the blacklist determination and instead incorporate the factor into the graylist score 808. The factors which are particularly suited to influencing the graylist score 808 may include a call frequency factor 802 (i.e., the frequency with which the caller has called a network telephone number today or in the past week or month). If a network operator with several hundred thousand phone numbers detects that the same caller is calling many of its users over a short period of time, then this may be a strong indication that the caller is a junk caller and, therefore, an undesired caller. For a typical network with high affinity (the tendency for users who are acquaintances to share the same telephone service), a typical residential user may call fewer than 25 numbers per million subscribers in a given month. By way of non-limiting example, a graylist score 808 may be set to equal the number of different on-network phone numbers called by the user in the last 30 days, minus 25

The factors influencing the graylist score 808 may further include a call locality factor 803. If a caller calls numbers in sequence, that may be an indication of a junk caller. In an example embodiment, the factor may be an integer indicating the length of the longest run of sequentially dialed numbers in the last 30 days. In an example embodiment, this graylist component score may be set to 20 times this number. Accordingly, a caller who dialed five phone numbers in sequence may get a graylist score 808 of 100 for just this component and the caller may be almost certainly a junk caller and, therefore, an undesired caller.

A blacklist prevalence factor 804 may mean that the caller has been blacklisted by many other users, which may be an indication of a junk caller. In an example embodiment, this graylist component score may be set to be 10 times an integer indicating the number of users in the network who have this number in their personal blacklist.

A whitelist prevalence factor 805 may mean that a caller is found on many user whitelists or has been called frequently by users on the network, which may be an indication that the call is valuable and should not be blocked. In an example embodiment, this graylist component score may be set to be −10 times an integer indicating the number of users in the network who have this number in their personal whitelist.

A call source type factor 806 may include calls from mobile numbers that are unlikely to be from junk callers, as most telemarketers operate from fixed locations using landlines instead of mobile phones. In an example embodiment, this graylist component score may be set to be −50 if the call is coming from a mobile phone number.

Mode adjust factor 807 may be used to alter the graylist score based on the mode detected by sensors and/or state of appliances. In some embodiments, the alteration is at least one of a pure scaling factor, change in the weighting of other factors, and other change to the graylist score using the mode detected. In various embodiments, mode adjust factor 807 does not alter the calculated score, but instead alters a threshold used to determines when a call is accepted or not (e.g., rejected).

According to an example embodiment, each of the factors above may be weighted and added or subtracted as they apply to a particular caller. The resulting score may be normalized in a range from 0 to 100 and then passed to the rest of the screening process.

Figure 9:
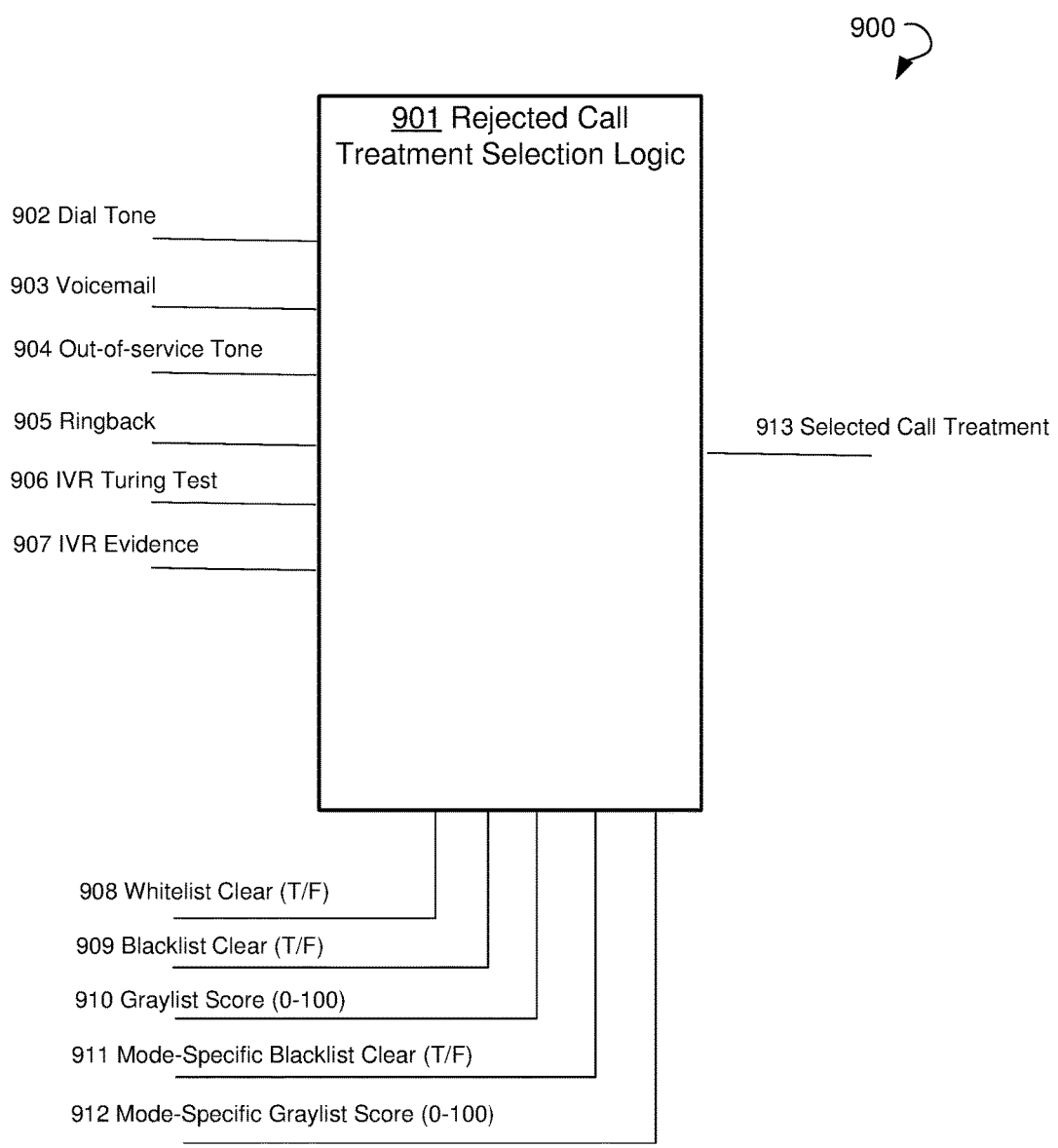
FIG. 9 is a simplified block diagram illustrating logic for handling rejected calls, according to an example embodiment.

FIG. 9 is a simplified block diagram for logic 900 for treating rejected calls. Since the system described herein effectively filters calls without any disturbance of the user, it is possible to engage in a counterattack against telemarketers for calls that are rejected in order to discourage their activities and make them less profitable when calling numbers on the protected network. The system may provide the user with several options for handling rejected callers.

The handling options may include a dial tone option 902 so that the rejected calls are terminated with a dial tone. Furthermore, in case of a voicemail option 903, rejected calls may be passed to voicemail. The voicemail may be flagged so that the user does not waste time listening to the message. Alternatively, the user may want to listen to such messages to make sure that the settings are not inadvertently blocking calls from legitimate users.

An out-of-service tone option 904 may be used, according to which rejected calls may be given the out-of-service tone, which may cause some automatic dialing systems to remove the number from their phone number list. This call treatment may prevent the undesired caller from wasting resources on a call that will never get through to an intended user. Furthermore, according to an example embodiment of option 905, there is no need to ring the phone for screened calls.

Furthermore, an IVR Turing test option 906 may be used to direct rejected calls to an IVR that simulates human conversation to prolong the time wasted by the undesired caller. For example, the IVR may answer the phone by asking the caller to wait for several minutes followed by a long pause. This may be followed by a Turing test wherein the challenge of the undesired caller may be to determine whether the IVR is a human or a machine while the purpose of the IVR challenge may be to prolong the conversation for as long as possible. Various personalities may be selected by the user for their Turing tests, for example a confused person whose conversation wanders, a drug addict who tries to take a message and forgets what he is doing and starts over, a dog owner who excuses himself to try to quiet the hound with barking in the background, and so forth.

A variation of the Turing Test call treatment may be an IVR Evidence 907 in which a further objective of the IVR may be to isolate the name of the caller and to determine whether the caller is covered by the constraints of the national "do not call" list. If the caller is covered, then the system may record the call as evidence for a complaint to an authority for the violation.

Selection 913 of which rejected call treatment to use may be based on what factors of logic block 901 caused the call to be rejected in the first place. For example, if the call is rejected because the caller is found on a user-generated global blacklist 909 or user generated mode-specific blacklist 911 (implying/indicating that the user is quite confident that the call is from an undesired caller), then a more aggressive call treatment such as the Turing test may be employed. If, however, the call is rejected because of a marginal score 910 from the graylist scoring engine or a marginal mode-specific graylist score 912 from the graylist scoring engine (with mode-specific adjustment factors applied to either the score or the threshold), then the call may be sent to voicemail in case a mistake was made in the scoring. Selection 913 may be also based on whether the caller is found on a user-generated whitelist 908. Selecting a call treatment may be as simple as directing the call to a server (such as a voicemail server or an announcement server) that connects the call and implements the desired treatment. Such servers are commonly employed using FreeSwitch or Asterisk soft switches.

Figure 10:
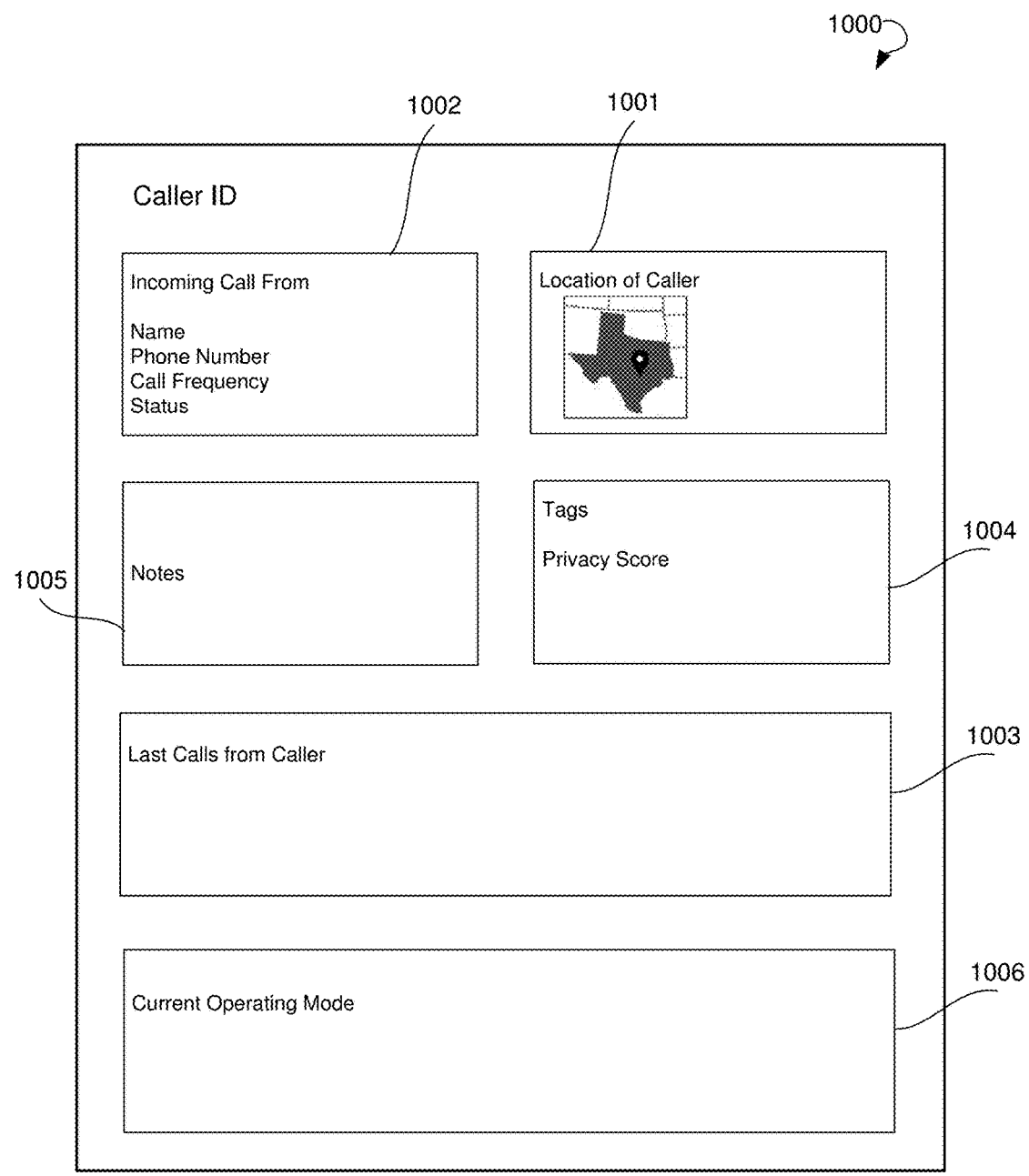
FIG. 10 illustrates a user interface for presenting a score of the caller, according to an example embodiment.

FIG. 10 illustrates a user interface 1000, according to an example embodiment. The user interface 1000 may present the information gathered by the system that may be relevant to a user deciding to answer a call. This information may be presented on the screen of a PC or, in compressed form, on the screen of a Digital Enhanced Cordless Telephone (DECT) handset or smartphone. The objective of the user interface 1000 may be to provide the user with as much information as possible that may be relevant to the decision of the user to accept the call. The location 1001 of the caller may be approximated based on the originating phone number or IP address (in the case of a VoIP call). Statistics 1002 for previous calls, such as a number of calls over a given time period, or what their duration was, may be presented. The number 1003 of calls to the service provider network may be provided along with their average call duration. The current mode 1006 of system can be displayed, which may include any particular adjustments being applied. Finally, the privacy score 1004 from the graylist calculator, and optionally the privacy score reflecting modifications based on the mode-specific graylist score modifier, or based on changing the criteria to decide the score is good or bad, might be provided. Notes 1005 associated with the caller may be presented. Furthermore, on-screen options to whitelist or blacklist the caller may be presented.

Figure 11:
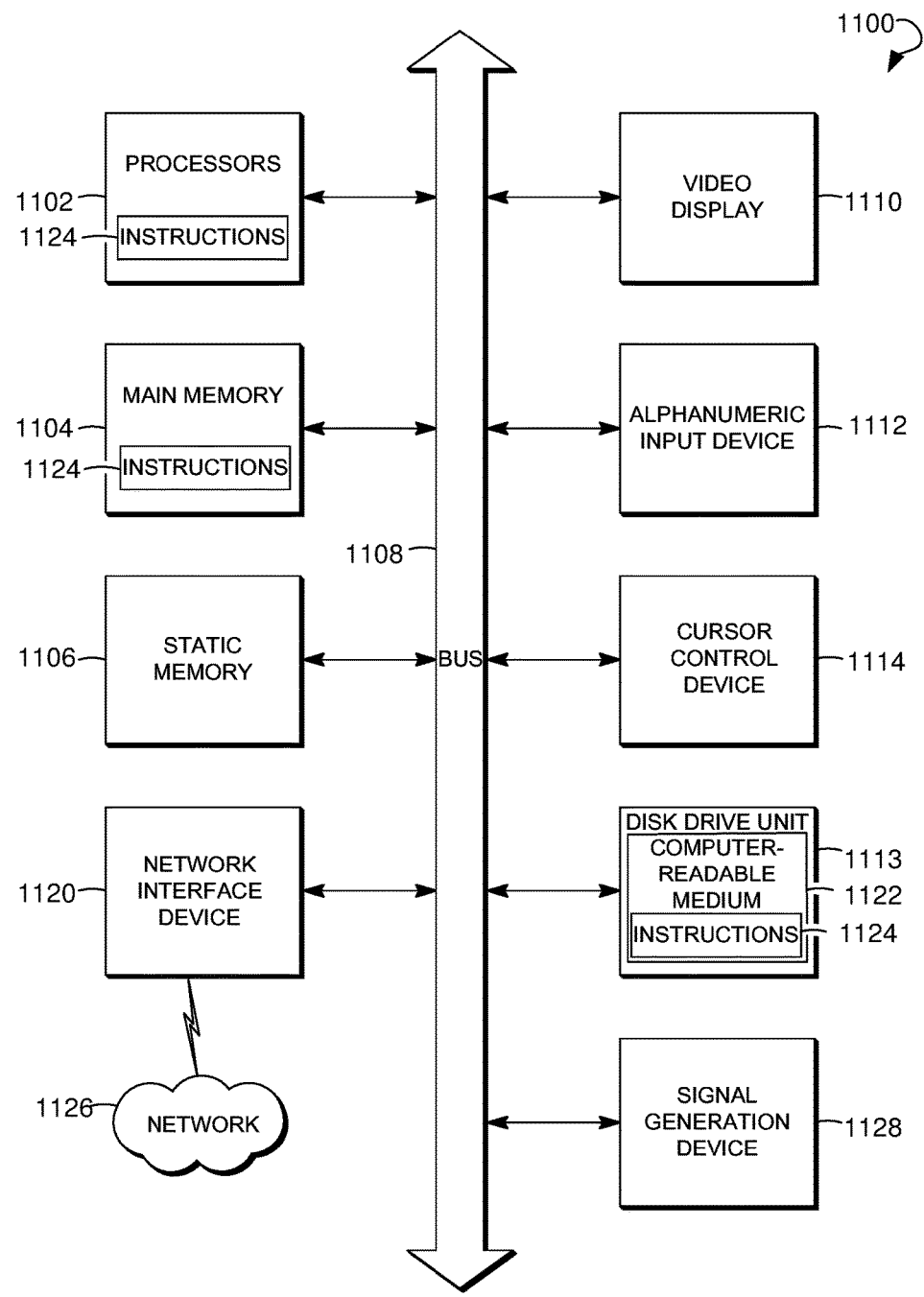
FIG. 11 shows a diagrammatic representation of a computing device for a machine in the example electronic form of a computer system, within which a set of instructions for causing the machine to perform any one or more of the methodologies discussed herein can be executed.

FIG. 11 shows a diagrammatic representation of a machine in the example electronic form of a computer system 1100, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor or multiple processors 1102 (e.g., a central processing unit (CPU), a graphics processing unit (GPU), or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 may also include an alphanumeric input device 1112 (e.g., a keyboard), a cursor control device 1114 (e.g., a mouse), a disk drive unit 1113, a signal generation device 1128 (e.g., a speaker), and a network interface device 1120.

The disk drive unit 1113 includes a non-transitory computer-readable medium 1122, on which is stored one or more sets of instructions and data structures (e.g., instructions 1124) embodying or utilized by any one or more of the methodologies or functions described herein. The instructions 1124 may also reside, completely or at least partially, within the main memory 1104 and/or within the processors 1102 during execution thereof by the computer system 1100. The main memory 1104 and the processors 1102 may also constitute machine-readable media.

The instructions 1124 may further be transmitted or received over a network 1126 via the network interface device 1120 utilizing any one of a number of well-known transfer protocols (e.g., Hyper Text Transfer Protocol (HTTP)).

In some embodiments, the computer system 1100 may be implemented as a cloud-based computing environment, such as a virtual machine operating within a computing cloud. In other embodiments, the computer system 1100 may itself include a cloud-based computing environment, where the functionalities of the computer system 1100 are executed in a distributed fashion. Thus, the computer system 1100, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, methods and systems for filtering telephone calls have been disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method performed by a computer for filtering a telephone call comprising:
    receiving from a caller the telephone call directed to a communication device associated with an intended call recipient, the Internet being disposed between the computer and the communication device, the intended call recipient being in a structure;
    determining a state of the intended call recipient using telemetry received from at least one of a sensor and an appliance disposed in the structure;
    scoring the telephone call based on predetermined scoring criteria to create a score indicative of a desirability of the telephone call, the predetermined scoring criteria being provided by the intended call recipient, the predetermined scoring criteria including the state of the intended call recipient;
    comparing the score to a predetermined threshold score;
    classifying the telephone call as an unwanted telephone call using the comparison; and
    selectively rejecting the unwanted telephone call.

2. The method of claim 1, wherein the scoring criteria further include a blacklist associated with the state of the intended call recipient.

3. The method of claim 1 further comprising:
    adjusting the predetermined threshold score using the state of the intended call recipient;
    comparing alternatively the score to the adjusted predetermined threshold score; and
    classifying alternatively the telephone call as an unwanted telephone call using the alternative comparison.

4. The method of claim 1, wherein the scoring criteria further include at least one of a global blacklist, whitelist, and graylist.

5. The method of claim 1, wherein the scoring criteria further include at least one of a time range, day of week, range of days, and time of year.

6. The method of claim 1, wherein the state of the intended call recipient is sleeping and the telemetry is received from at least one of a motion sensor associated with an alarm system and a motion sensor associated with a thermostat.

7. The method of claim 1, wherein the state of the intended call recipient is eating and the telemetry is received from at least one of a refrigerator, stove, oven, and a motion sensor associated with a kitchen and/or dining room.

8. The method of claim 1, wherein the state of the intended call recipient is consuming media and the telemetry is received from an audio/video receiver (AVR).

9. The method of claim 1, wherein the state of the intended call recipient is entertaining a guest and the telemetry is received from at least one microphone associated with one or more of a computer, video game console, handheld gaming device, cordless phone, cellular phone, smart phone, smart television system, and security system.

10. The method of claim 1, wherein the telemetry is received form at least one of an alarm system, a smart thermostat, refrigerator, stove, oven, television, set-top box, video game console, media player, and stereo sound system.

11. A system for filtering a telephone call, the system comprising:
    at least one processor; and
    a memory coupled to the at least one processor, the memory storing instructions executable by the at least one processor to perform a method comprising:
        receiving from a caller the telephone call directed to a communication device associated with an intended call recipient, the Internet being disposed between the at least one processor and the communication device, the intended call recipient being in a structure;

determining a state of the intended call recipient using telemetry received from at least one of a sensor and an appliance disposed in the structure;

scoring the telephone call based on predetermined scoring criteria to create a score indicative of a desirability of the telephone call, the predetermined scoring criteria being provided by the intended call recipient, the predetermined scoring criteria including the state of the intended call recipient;

comparing the score to a predetermined threshold score;

classifying the telephone call as an unwanted telephone call using the comparison; and selectively rejecting the unwanted telephone call.

12. The system of claim 11, wherein the scoring criteria further include a blacklist associated with the state of the intended call recipient.

13. The system of claim 11, wherein the method further comprises:

adjusting the predetermined threshold score using the state of the intended call recipient;

comparing alternatively the score to the adjusted predetermined threshold score; and classifying alternatively the telephone call as an unwanted telephone call using the alternative comparison.

14. The system of claim 11, wherein the scoring criteria further include at least one of a global blacklist, whitelist, and graylist.

15. The system of claim 11, wherein the scoring criteria further include at least one of a time range, day of week, range of days, and time of year.

16. The system of claim 11, wherein the state of the intended call recipient is sleeping and the telemetry is received from at least one of a motion sensor associated with an alarm system and a motion sensor associated with a thermostat.

17. The system of claim 11, wherein the state of the intended call recipient is eating and the telemetry is received from at least one of a refrigerator, stove, oven, and a motion sensor associated with a kitchen and/or dining room.

18. The system of claim 11, wherein the state of the intended call recipient is consuming media and the telemetry is received from an audio/video receiver (AVR).

19. The system of claim 11, wherein the state of the intended call recipient is entertaining a guest and the telemetry is received from at least one microphone associated with one or more of a computer, video game console, handheld gaming device, cordless phone, cellular phone, smart phone, smart television system, and security system.

20. The system of claim 11, wherein the telemetry is received form at least one of an alarm system, a smart thermometer, refrigerator, stove, oven, television, set-top box, video game console, media player, and stereo sound system.

* * * * *